(12) United States Patent
Konno et al.

(10) Patent No.: US 7,071,819 B2
(45) Date of Patent: Jul. 4, 2006

(54) REMOTE CONTROL LOCK OPERATION SYSTEM FOR VEHICLES

(75) Inventors: Takeshi Konno, Saitama (JP); Masayoshi Orita, Saitama (JP); Atsuo Ota, Saitama (JP)

(73) Assignee: Honda Giken Kogyo Kabushiki Kaisha, Tokyo (JO)

( * ) Notice: Subject to any disclaimer, the term of this patent is extended or adjusted under 35 U.S.C. 154(b) by 231 days.

(21) Appl. No.: 10/178,614

(22) Filed: Jun. 25, 2002

(65) Prior Publication Data
US 2003/0024754 A1  Feb. 6, 2003

(30) Foreign Application Priority Data
Jul. 5, 2001 (JP) .............................. 2001-204743
Jul. 5, 2001 (JP) .............................. 2001-204744

(51) Int. Cl.
*B60R 25/10* (2006.01)
(52) U.S. Cl. .................... 340/427; 70/252; 70/277; 307/10.2; 307/142; 340/426.28; 340/432
(58) Field of Classification Search .......... 340/426.1, 340/427, 426.11, 426.13, 426.17, 426.2, 426.21, 340/5.31, 5.7, 426.36, 426.28, 432; 307/9.1, 307/142, 139, 125, 10.2; 70/277, 252
See application file for complete search history.

(56) References Cited

U.S. PATENT DOCUMENTS

| 5,181,403 | A | * | 1/1993 | Lii .............................. 70/38 C |
| 5,343,077 | A | | 8/1994 | Yoshida et al. .............. 307/9.1 |
| 5,634,358 | A | | 6/1997 | Myers ......................... 70/233 |
| 6,028,507 | A | * | 2/2000 | Banks et al. ................ 340/427 |
| 6,237,710 | B1 | | 5/2001 | Mori et al. .................. 180/219 |
| 6,462,431 | B1 | * | 10/2002 | Woo ............................ 307/9.1 |
| 6,515,580 | B1 | * | 2/2003 | Isoda et al. .............. 340/425.5 |
| 6,759,828 | B1 | * | 7/2004 | Konno ........................ 307/9.1 |
| 2001/0022248 | A1 | * | 9/2001 | Mori et al. .................. 180/219 |
| 2001/0029758 | A1 | * | 10/2001 | Kehr ............................ 70/252 |
| 2002/0121971 | A1 | * | 9/2002 | Konno ........................ 340/426 |
| 2002/0180273 | A1 | * | 12/2002 | Konno et al. .............. 307/10.2 |

FOREIGN PATENT DOCUMENTS

| DE | 199 32 222 A1 | 1/2000 |
| EP | 0 610 902 A2 | 8/1994 |
| EP | 0 913 979 A2 | 5/1999 |
| GB | 2 340 642 A | 2/2000 |
| JP | 02001278154 | * 10/2001 |

* cited by examiner

*Primary Examiner*—Brent A. Swarthout
(74) *Attorney, Agent, or Firm*—Birch,Stewart,Kolasch & Birch,LLP (57) ABSTRACT

A remote control lock operation system for a vehicle capable of unlocking a mechanical locking mechanism for mechanically disabling traveling of the vehicle by a infrared signal, without using the key. Components of the system include a handheld remote control transmitter, a receiver, a mechanical locking mechanism, a lock actuator and control unit, and wiring sections for connecting the lock actuator and the receiver to the control unit mounted in a common module housing contained on the vehicle body. The main components of the system, including the wiring section leading to the lock actuator, are unitized and integrate into the common module housing in order to prevent unauthorized unlocking of the lock. Also provided is a mobile communication terminal having an infrared transmitting port, and a method for using of the terminal. The mobile communication terminal for operating the remote control lock operation device, even when the remote control transmitter is lost, or for some other reason is not available.

17 Claims, 8 Drawing Sheets

ELECTRONIC NOTEPADS

LAPTOP COMPUTER

FIG. 8

REMOTE CONTROL LOCK OPERATION SYSTEM FOR VEHICLES

CROSS-REFERENCE TO RELATED APPLICATIONS

The present application claims priority under 35 U.S.C. §119 to Japanese Patent Application Nos. 2001-204744 and 2001-204743, filed on Jul. 5, 2001, the entire contents thereof are hereby incorporated by reference.

BACKGROUND OF THE INVENTION

1. Field of the Invention

The present invention relates to a remote control lock operation system for vehicles comprising a hand-held remote control transmitter, a receiver capable of receiving a signal transmitted by the transmitter, a control unit for determining whether or not the signal received by the receiver is acceptable and then operating and controlling the lock actuator based on the received signal when it is acceptable. The invention also relates to a system and method for providing an emergency operation of the lock control system even when the hand-held remote control transmitter has been lost.

2. Description of Background Art

In four-wheeled vehicles of recent years, a remote control operation system using an infrared signal for locking and unlocking the door locking mechanism without using the key is widely employed.

On the other hand, in light vehicles such as the conventional motorcycles, and scooters, various mechanical locking mechanisms (for example, a main stand locking mechanism, a handle locking mechanism, and so on) are provided in right positions for mechanically disabling traveling of the vehicles for prevention of theft or tampering. These mechanical locking mechanisms are adapted to be locked and unlocked arbitrarily by the user by directly operating the lock operation portion provided on the vehicle body with the key.

In order to enable the mechanical locking mechanism as described above to be unlocked by the remote control lock operation system using the infrared signal, without using the key, it is possible to have a remote control lock operation system for mechanical locking mechanism by combining the transmitter, the receiver, the lock actuator for driving the mechanical locking mechanism, and the control unit with the mechanical locking mechanism.

However, a remote control lock operation system thus constructed, can be unlocked easily, by simply connecting the battery power source to the wiring section leading to the lock actuator. As such, a vehicle so equipped can be readily stolen. Moreover, with this configuration the total number of the components of the system is large, and thus the system becomes complex, which may result an increase in costs and weight.

Another problem exists in the case where the user has lost the remote control transmitter, or for some other reason is not available. If this occurs, the infrared signal that corresponds to the prescribed identification data of the system cannot be transmitted. Thus, the lock actuator cannot be operated and controlled (that is, locked and unlocked) without using a key.

SUMMARY AND OBJECTS OF THE INVENTION

The present invention is proposed considering the above circumstances. It is an object of the present invention to provide a simple system and method for enabling and disabling the mechanical locking mechanism for a vehicle by means of a hand-held remote control transmitter.

In addition, it is an object of the present invention to provide a mobile communication terminal system and a method for emergency operation of the infrared remote control lock system, even when the remote control transmitter has been lost, or for some reason is not available.

In order to achieve the aforementioned object, the present invention provides a remote control lock operation system for vehicles comprising a hand-held transmitter, a receiver capable of receiving the signal transmitted by the transmitter, a mechanical locking mechanism for mechanically disabling travel of the vehicle, a lock actuator capable of at least unlocking the mechanical locking mechanism, and a control unit for determining whether or not the signal received by the receiver is acceptable, and operating and controlling the lock actuator based on the received signal when the signal is acceptable. The receiver, the mechanical locking mechanism, the lock actuator and the control unit thereof, and the wiring section connecting the lock actuator and the receiver to the control unit are provided in a common module housing, and are mounted to the vehicle body via the housing.

Also, since the mechanical locking mechanism, the receiver, and the lock actuator, the control unit, and the interconnecting wiring section are integrated and united together in the common module housing, the total number of the components is small. Thus, it is easy to handle and to install on the vehicle body. As a consequence, the system may be reduced in size, weight, and cost. In addition, modification of the portion on the vehicle body on which the system is to be mounted may be minimized. Further, since the wiring section leading to the lock actuator can be hidden and protected in the module housing and not to be exposed toward the outside, it is possible to prevent an unauthorized person from unlocking and stealing the vehicle by simply connecting the wiring section directly to die battery power source, or changing connection thereof.

The invention also provides a drive enable signal generating means controlled by the control unit based on the signal received by the receiver, and which is capable of generating a drive enable signal for enabling actuation or operation of the engine. The drive enable signal generating means is mounted in the module housing together with the wiring section for connecting the means to the control unit. Accordingly, in the unlikely event that the main power source is turned on by an unauthorized person, the engine cannot be started unless the drive enable signal generating means in the module housing generates a drive enable signal based on the regular signal received by the receiver.

Further, in the invention, a part of a power distribution circuit for distributing a power from the vehicle-mounted battery to the vehicle-mounted electric equipment, a main relay for opening and closing the part of the power distribution circuit, and a main switch for turning the main relay on and off are mounted in the module housing. Thus, since the main switch and the main relay are also integrated in the module housing, the system can further be consolidated.

The vehicle of the present invention is a two-wheeled vehicle including a front fork for rotatably supporting the front wheel, a steering shaft rotatably supported on the front portion of the vehicle body for linking the front fork and the steering handle to steer and operate the front wheel, a front body cover for covering the front side of the steering shaft, and an inner cover connected to the front body cover for covering the rear side of the steering shaft. The module housing is disposed in a vehicle body space formed between the front body cover and the inner cover. A signal receiving portion of the receiver on the rear surface thereof is exposed toward the rear through the opening of the inner cover. The mechanical locking mechanism is a handle locking mechanism capable of locking the rotation of the steering shaft. Accordingly, the remote control lock operation system, including the handle locking mechanism unitized integrally therewith, may be easily provided in the two-wheeled vehicle. Moreover, the signal receiving portion of the receiver may be secured toward the rear through the opening on the inner cover, and in this position, be able to receive signals over a wide range of angles.

The invention furthers provides a mobile communication terminal having an infrared transmitting port capable of transmitting the infrared signal, input operation means for commanding transmission of the infrared signal from the infrared transmitting port arbitrarily, and transmission control means for allowing the infrared signal corresponding to the prescribed identification data to be transmitted from the infrared transmitting port in response to the input operation on the input operation means.

The mobile communication terminal can be used instead of the hand-held remote control transmitter in those cases when the remote control transmitter has been lost or is not available for some reason. The user enters data into the mobile communication terminal via the input operation means, and allows an infrared signal corresponding to the prescribed identification data to be transmitted from the infrared transmitting port with the infrared transmitting port of the mobile communication terminal faced toward the infrared receiving portion on the remote control receiver. When the infrared signal is received by the infrared receiving portion on the remote control receiver, the control unit of the remote control lock operation device operates and controls the lock actuator upon receipt of the infrared signal. Therefore, even when the remote control transmitter is not in the user's hands due to loss or some other reasons, the lock actuator can be operated and controlled easily by utilizing the mobile communication terminal provided with an infrared transmitting port, without using the key.

Further, the invention provides for an emergency operating system for operating and controlling the lock actuator of the infrared remote control lock operation device including a mobile communication terminal having an infrared transmitting port that is capable of transmitting an infrared signal and a service center capable of transmitting a command signal as needed to the mobile communication terminal. The mobile communication terminal includes receiving means capable of receiving a command signal transmitted from the service center, and transmission control means for allowing an infrared signal corresponding to the prescribed identification data to be transmitted from the infrared transmitting port upon receipt of the command signal. The service center includes communication means for receiving notification from the user, and information storage means in which information for identifying the user upon receipt of notification is stored in advance.

In addition, the invention involves a method of emergency operation for operating and controlling the lock actuator of the infrared remote control lock operation device. The steps of the method of the include:

entering a transmission program in advance into the mobile communication terminal having an infrared transmitting port capable of transmitting an infrared signal and the capability of receiving the signal transmitted from the service center so that the terminal transmits the infrared signal corresponding to the prescribed identification data from the infrared transmitting port according to the command signal transmitted from the service center, identifying the user when the service center received notification from the user, facing the infrared transmitting port on the mobile communication terminal toward the infrared receiving portion on the remote control receiver, and transmitting the infrared signal corresponding to the prescribed identification data from the infrared transmitting port of the terminal toward the infrared receiving portion on the remote control receiver by transmitting the command signal from the service center to the mobile communication terminal based on the identification to operate and control the lock actuator.

As the result of above aspects of the invention, in the case where the remote control transmitter is not in the user's hands due to loss or having been forgotten, the service center can identify the user upon receipt of notification from the user. Then, after identifying the user, a command signal is transmitted to the mobile communication terminal. When the communication terminal receives the command signal from the service center, the terminal transmits the infrared signal corresponding to the prescribed identification data from the infrared transmitting port upon receipt of the command signal. Therefore, if the infrared transmitting port faces toward the infrared receiving port on the remote control receiver, the infrared signal transmitted from the infrared transmitting port is received by the infrared receiving portion on the remote control receiver, and the control unit of the remote control lock operation device operates and controls the lock actuator according to the received signal. Therefore, even when the remote control transmitter has been lost, or is not in the user's hands due to some other reasons, the lock actuator can be operated and controlled by using the mobile communication terminal having the infrared transmitting port easily without using key.

In addition, since the terminal must receive the command signal transmitted after identification of the user by the service center before operating and controlling the lock actuator using the mobile communication terminal, unauthorized operation or theft of the vehicle can be prevented.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
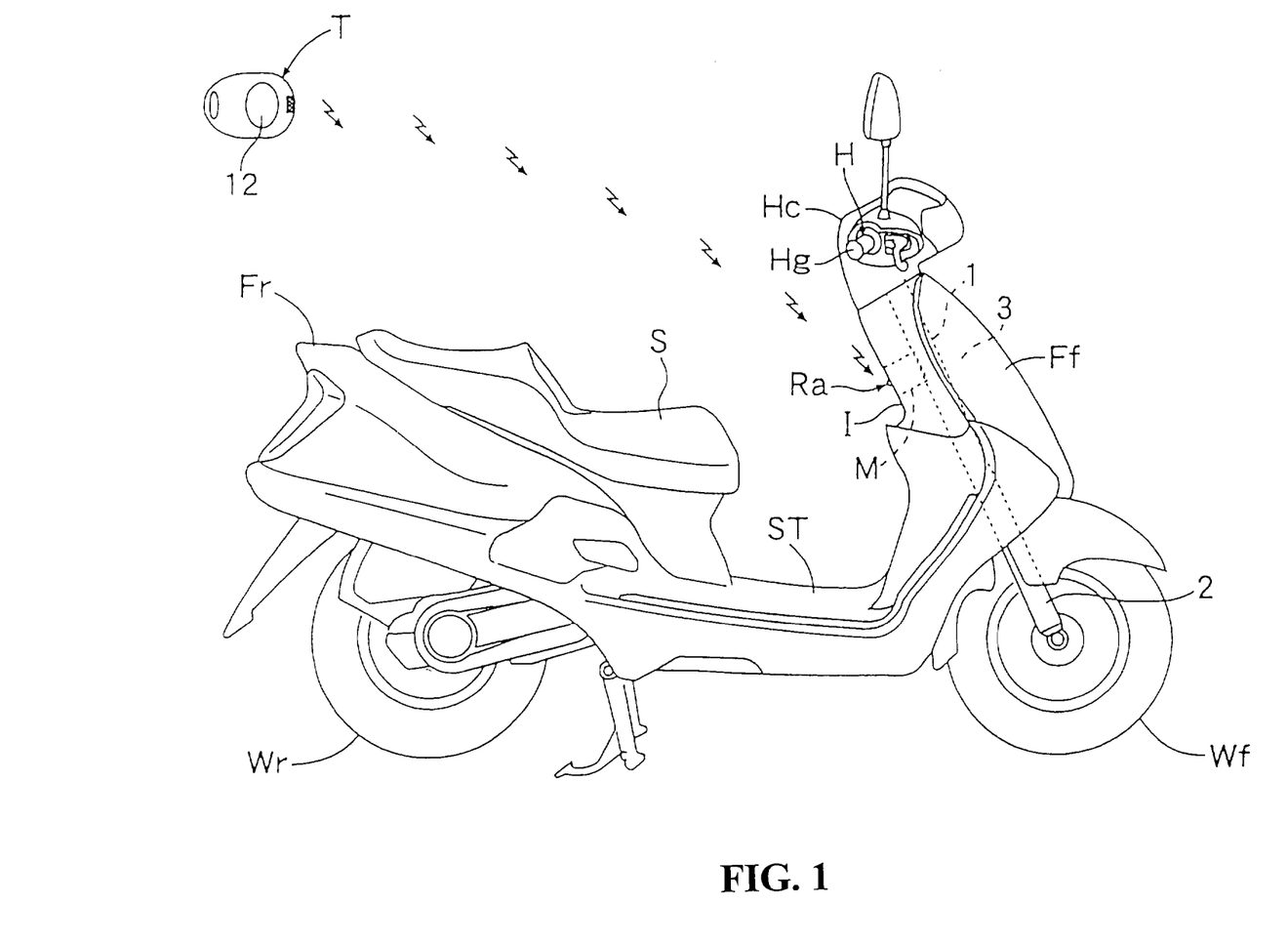
FIG. 1 is a general side view of the scooter according to the present invention.
Figure 2:
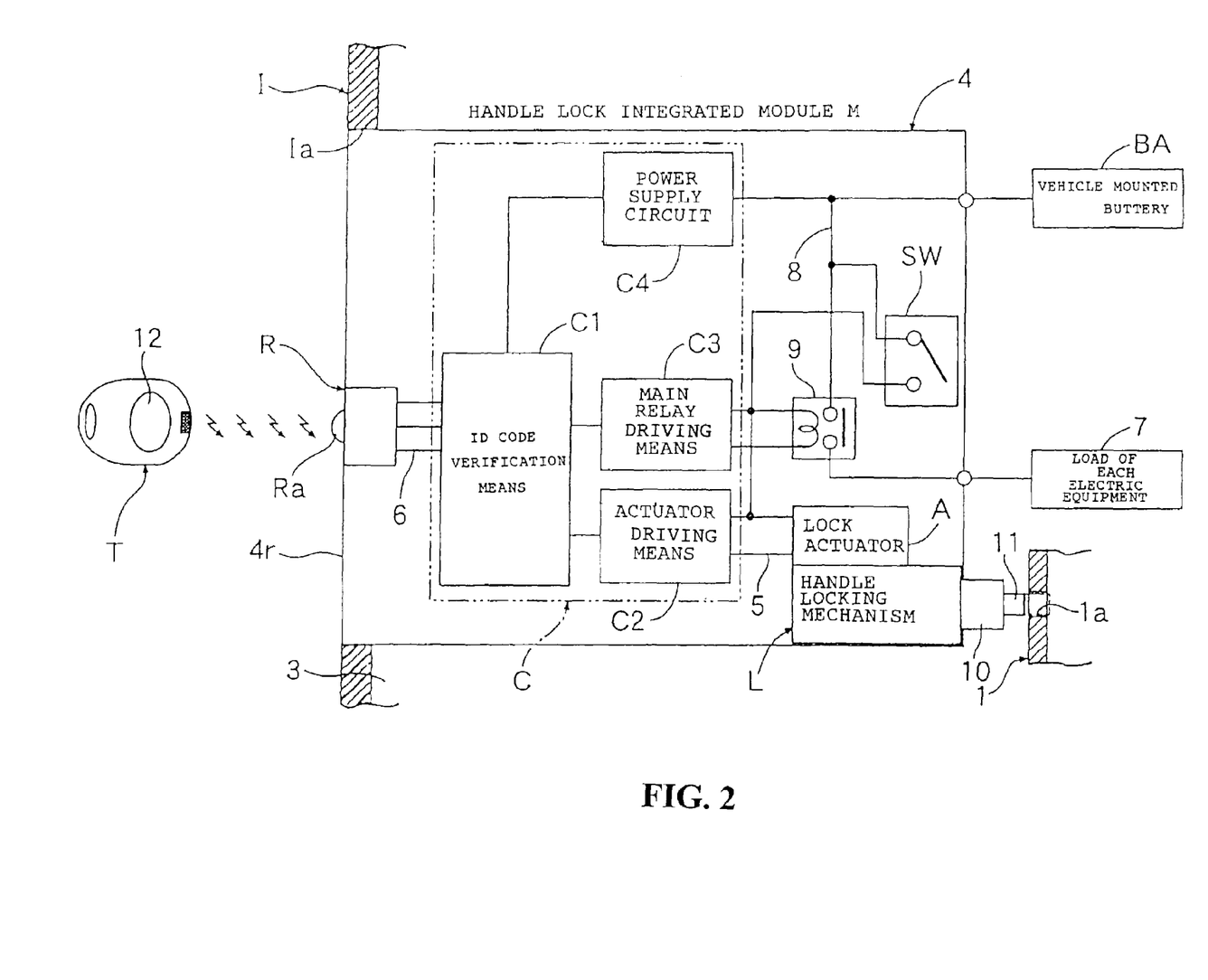
FIG. 2 is a block diagram showing a first embodiment of the integrated handle lock module.

In FIG. 1 and FIG. 2, the scooter V as a vehicle comprises a step ST for placing the occupant's feet between the front and rear wheels Wf, Wr, and a seat S is disposed on the rear body cover Fr as a rear vehicle body extending upward from the rear end of the step ST.

The steering shaft 1 of the scooter V is rotatably supported by the head pipe of the metallic vehicle body frame, not shown, and extends vertically but inclining toward the rear inside, or the back side of the front body cover Ff formed of metal or synthetic resin as a front vehicle body. A front fork 2 for rotatably supporting the front wheel Wf is connected to the lower end of the steering shaft 1, and the upper end of the steering shaft 1 is connected to the central portion of the bar handle H. Therefore, turning operation of the bar handle H is transmitted to the steering shaft 1 and the front fork 2, and thus the front wheel Wf is steered.

The central portion of the bar handle H and the upper end of the steering shaft 1 are covered by the handle cover Hc being formed of metal or synthetic resin and rotated integrally therewith for appearance sake. The left and right handle grips Hg on both ends of the bar handle H are projected respectively from the left and right ends of the handle cover Hc.

The rear side of the portion lower than the handle cove Hc of the steering shaft 1 is covered by the inner cover I being formed of metal or synthetic resin and extending integrally upward from the front end of the step ST. The inner cover I is detachably connected to the backside of the front body cover Ff, and a vehicle body space 3 is formed between the rear side of the cover Ff and the inner cover I, through which the steering shaft 1 passes.

A lock module M including a handle locking mechanism L for locking rotation of the steering shaft 1 (therefore, the handle H) while being parked. A main portion of the remote control lock operation system for remotely controlling the same integrally united with each other is mounted in the vehicle body space 3.

Referring to FIG. 2, the construction of the lock module M will be described. The lock module M has a box-shaped module housing 4. Mounted in the module housing 4, are an infrared receiver R being capable of receiving the infrared signal transmitted from the infrared transmitter T carried by the occupant, a handle locking mechanism L as a mechanical locking mechanism that disables traveling of the vehicle mechanically, and a lock actuator A coupled to the handle locking mechanism L for locking and unlocking the same.

Also mounted in the module housing 4 are a control unit C for determining whether of not the signal received by the receiver R is acceptable and operating and controlling the lock actuator A based on the received signal when it is acceptable are mounted in the module housing 4, and the wiring sections 5, 6 connecting the lock actuator A and the receiver R with the control unit C respectively.

Also, a part of a power distribution circuit 8 for distributing a power to the respective vehicle-mounted electric equipment 7 from a battery BA, a main relay 9 capable of opening and closing the part of the power distribution circuit 8, and a main switch SW for turning the main relay 9 on and off are mounted in the module housing 4. The main switch SW, being also connected to the lock actuator A, is adapted to operate the lock actuator A, irrespective of the control unit C, to unlock the handle locking mechanism L by turning the switch SW on.

The module housing 4 is inserted into the vehicle body space 3 through the opening Ia formed on the inner cover I from the backside, and fixed on a suitable position on the vehicle body frame, not shown, for example, on the head pipe, or the like. In this fixed state, at least a part of the rear surface 4r of the module housing 4 is exposed toward the outside through the opening Ia of the inner cover I. The signal receiving portion Ra of the receiver R is disposed on the rear surface 4r of the module housing 4 so as to be capable of receiving the signal from the rear.

The handle locking mechanism L comprises a lock case 10 fixed on the front end of the module housing 4 and a lock pin 11 driven by the lock actuator A and moves from the lock case 10 toward and away from the steering shaft 1. The steering shaft 1 is formed with a locking hole 1a on the peripheral wall thereof at the position corresponding to the lock pin 11. The lock pin 11 engages the locking hole 1a to lock the steering shaft 1 at a prescribed rotational position, that is, brings the locking mechanism L in the locked state, when it is positioned at the prescribed frontmost locking position.

Locking pin 11 comes out of the locking hole 1a and allows free rotation of the steering shaft 1, that is, brings the locking mechanism L into the unlocked state, when it is in the unlocking position that is backed away from the locked position by a prescribed amount.

A key cylinder (not shown) in which the ignition key can be inserted is disposed in the module housing 4. The cooperative relation between the key cylinder and the handle locking mechanism L is the same as that between the handle locking mechanism for motorcycles and the key cylinder that is known in the related art, so that the handle locking mechanism L can be locked in conjunction with pulling out of the ignition key. The key cylinder is constructed so as to open and close the main switch SW in conjunction with the operation of the ignition key as in the case of the key cylinder for ignition key in the motorcycle that is known in the related art.

The transmitter T is embedded with a operating switch 12 for performing the unlocking operation, and with signal transmitting means (not shown) that is capable of transmitting the infrared signal corresponding to the specific ID code by input operation of the switch 12. The structure of such infrared transmitter is well known in the related art.

The control unit C includes an ID code verification means C1 as a signal determination portion including the CPU and the memory, an actuator driving means C2 for supplying actuation command signal to the lock actuator A, main relay driving means C3 for supplying actuation command signal to the main relay 9, and the power supply circuit C4.

The ID code verification means C1 verifies and determines whether or not the infrared signal received by the infrared receiver R is acceptable, that is, whether or not the ID code of the received signal coincides with the specific ID code stored in advance. When the ID code verification means C1 determines that the received signal is a regular infrared signal (the ID code was coincided), the actuation command signal is supplied from the actuator driving means C2 to the lock actuator A.

The main relay 9 is connected to the main relay driving means C3 and the main switch SW in the module housing 4, and turning ON of the main relay 9 enables power distribution from the battery BA to the respective electric equipment 7 (including the engine starting circuit) mounted on the vehicle.

Subsequently, the operation of the aforementioned embodiment will be described.

It is assumed that the scooter V is in the parked state and the handle locking mechanism L is in the locked state.

When the infrared signal is transmitted from the infrared transmitter T and received by the infrared receiver R in this state, whether or not the received signal is acceptable, that is, whether or not the ID code in the received signal coincides with the specific ID code stored in advance is determined at the ID code verification means C1 in the control unit C. When the received signal is determined to be a regular infrared signal (the ID code is coincided), the actuator driving means C2 is turned ON and supplies an actuation command signal to the lock actuator A so as to switch the actuator A into the unlocked state, thereby unlocking the handle locking mechanism L. Simultaneously, the ID code verification means C1 turns the main relay driving means C3 ON, and brings the main relay 9 into the power distribution enabled state.

When the main switch SW is switched from OFF to ON by operating the ignition key, the main relay 9 is turned ON and thus the main power supply is applied, whereby enabling power distribution to the respective electric equipment 7 including the engine staring circuit. Therefore, when the starting switch (not shown) is turned ON by operating the ignition key in this state, power is distributed to the engine staring circuit so that the engine can be started. When starting operation is terminated, the scooter V is brought into a state of being able to travel.

This embodiment provides a theft prevention mechanism in the case where the main relay 9 is brought into the power distribution enabled state as described above but left as it is with the main switch SW in the OFF state. This is provided by the control unit C which is programmed in such a manner that when the main switch SW is not turned on even after a certain period of time elapsed since the main relay 9 is brought into the power distribution enabled state, the ID code verification means C1 turns the main relay driving means C3 OFF. This brings the main relay 9 into the power distribution disabled state and invalidates the previous ID code verification, therefore restoring the lock actuator A again to the locked state.

In order to stop the engine in the operating state, the main switch SW is switched from ON to OFF by operating the ignition key. As a consequence, power distribution to the electric system of the engine is closed off, and thus the engine stops. Subsequently, when the ignition key is pulled out from the key cylinder (as in the case of the handle locking mechanism in the motorcycle that is known in the related art) from this state, the lock of the locking mechanism L is simultaneously actuated, so that the steering shaft 1 is locked.

This embodiment also provides a theft prevention mechanism in the case where the engine is left as it is in the stopped state. This is accomplished by programming the control unit C in such a manner that when a certain period of time has elapsed after the engine is stopped, the ID code verification means C1 turns the main relay driving means C3 OFF. This agains brings the main relay 9 into the power distribution disabled state and invalidates the previous ID code verification. Thus, the lock actuator A is again restored to the locked state.

When the ignition key is operated and the main switch SW is turned ON in a state in which the handle locking mechanism L is locked, the lock actuator A can be operated irrespective of the remote control lock operation system to unlock the handle locking mechanism L. Therefore, it can be unlocked with the ignition key without using the transmitter T as in the case of the normal remote control door locking device for vehicles in the related art.

As described above, according to this embodiment, the handle locking mechanism L, the receiver R, and the lock actuator A and the control unit C thereof that are the main components of the remote control lock operation system, and the wiring sections 5, 6 for connecting the lock actuator A and the receiver R to the control unit C are all unitized in the common module housing 4. As such, they can be mounted on the vehicle body via the housing 4 in a single operation. Also, the total number of the components is small, and thus the unit is easy to handle and install on the vehicle body.

Since the wiring section 5 leading to the lock actuator can be hidden and protected in the module housing 4 and not to be exposed toward the outside, the chance of an unauthorized user connecting the wiring section 5 directly to the battery power source BA or changing the connection thereof may be effectively prevented.

Furthermore, the main switch SW and the main relay 9 are also integrated in the module housing 4, the system may further be consolidated, and thus the costs may be reduced.

Figure 3:
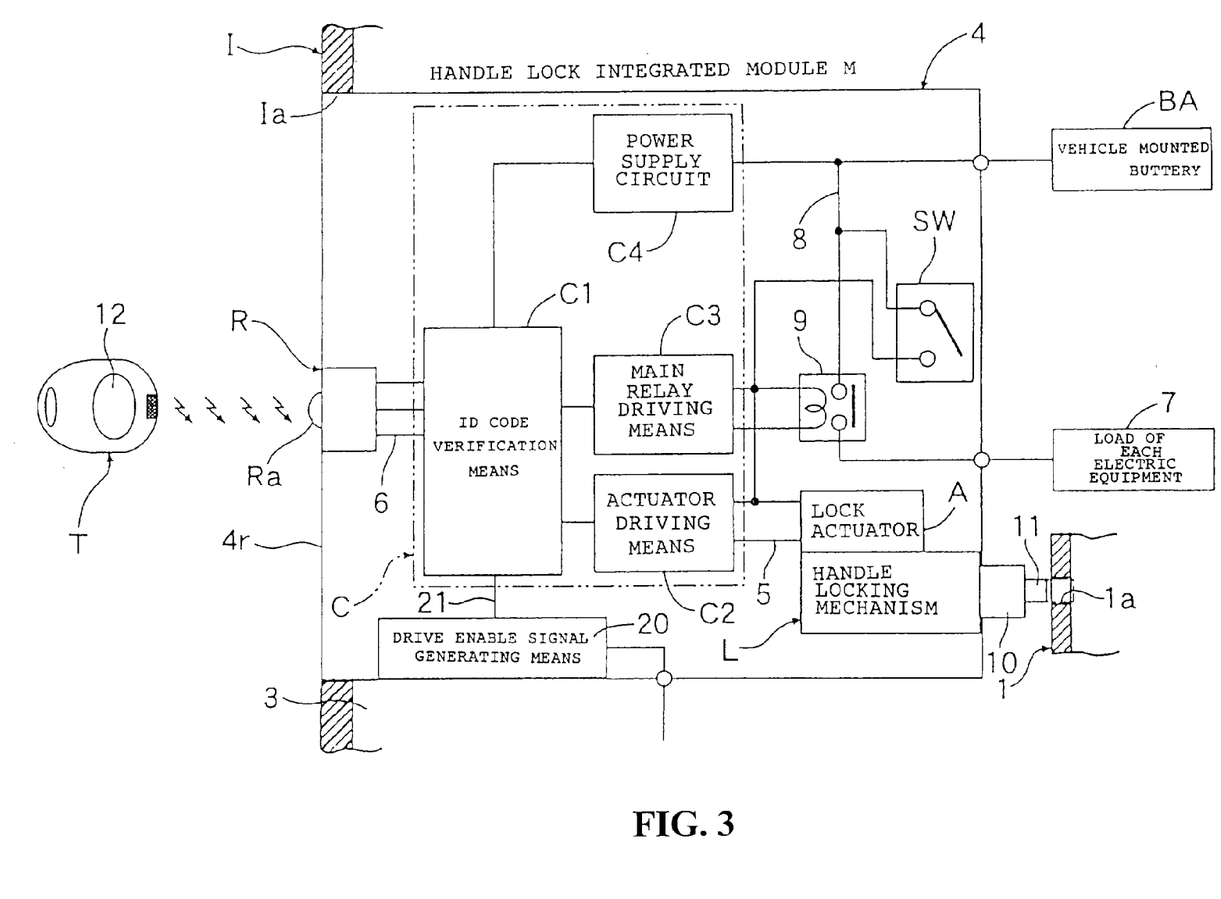
FIG. 3 is a block diagram showing a second embodiment of the integrated handle lock module.

FIG. 3 shows a second embodiment of the integrated handle lock module M. In this embodiment, the drive enable signal generating means 20 controlled by the control unit C based on the signal received by the receiver R and capable of generating a drive enable signal for enabling starting or operation of the engine is mounted in the module housing 4 together with the wiring section 21 for connecting the means 20 to the control unit C.

As the drive enable signal generating means 20, for example, a digital signal (ON-OFF signal) output means for enabling and disabling ignition (fuel injection) of the engine, a default reference voltage output means for enabling and disabling ignition (fuel injection), or a digital code output means for enabling and disabling ignition (fuel injection) may be used. The output means is connected to the ignition control system, the fuel injection control system, or the starter motor control system of the engine, not shown. The drive enable signal generating means 20 is located in the module housing 4.

Therefore, according to this embodiment, in the unlikely event that the main power source is turned by an unauthorized user, neither the fuel injection control system, the starter motor control system of the engine, nor the engine can be started or be operated, unless the drive enable signal generating means 20 generates a drive enable signal based on the regular signal received by the receiver R. This then, affords another means for theft prevention.

Figure 4:
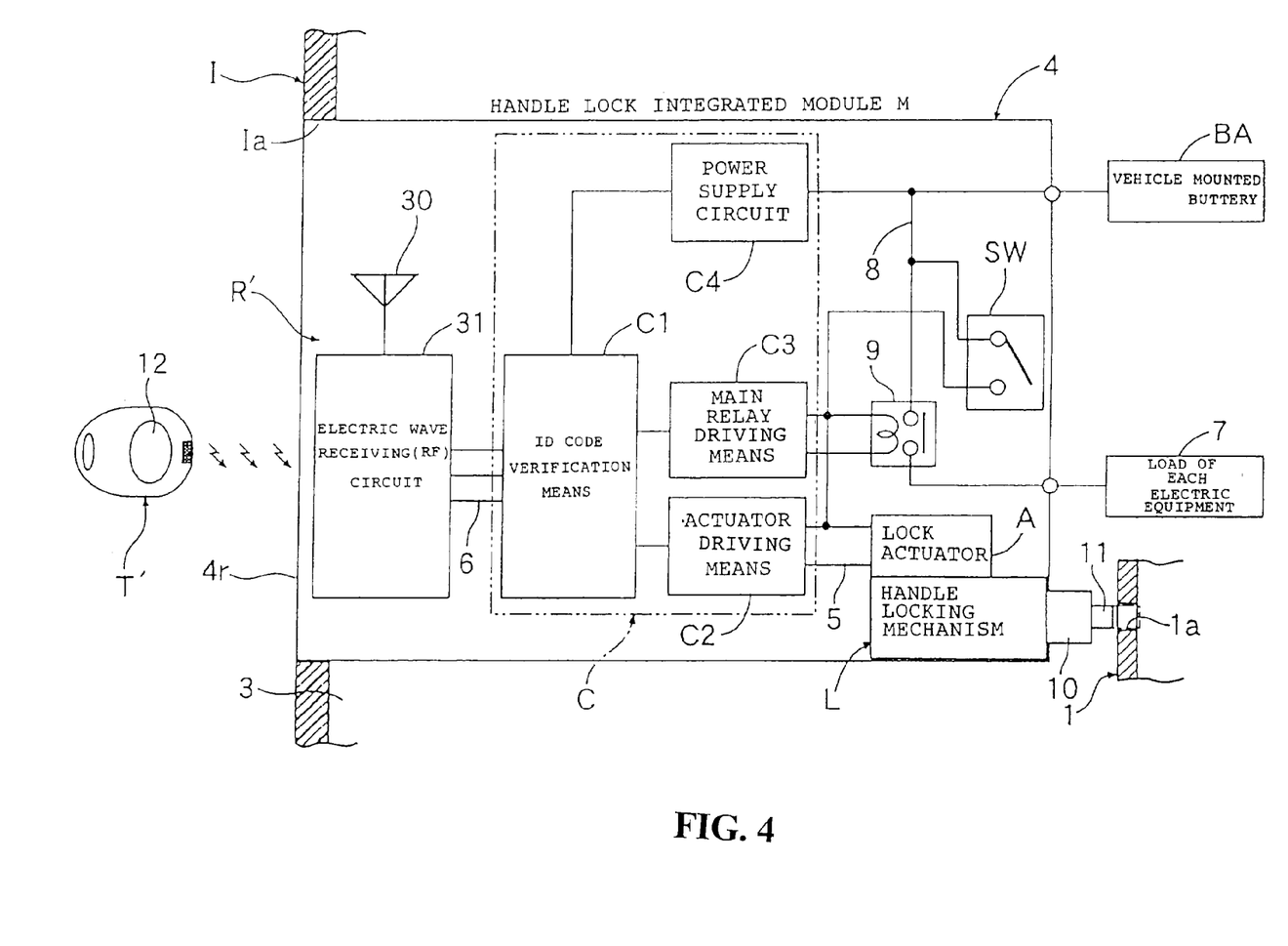
FIG. 4 is a schematic drawing showing a third embodiment of the integrated handle lock module.

FIG. 4 shows a third embodiment of the integrated handle lock module M. In this embodiment, a transmitter T' and a receiver R' for transmitting the electric wave signal corresponding to the specific ID code is used instead of the transmitter T and the receiver R for transmitting the infrared signal. Therefore, the module housing 4 does not have an infrared receiver R, and an antenna 30 and an electric wave receiving circuit 31 constituting the electric wave receiver R' are integrated in the housing 4 instead.

Figure 5:
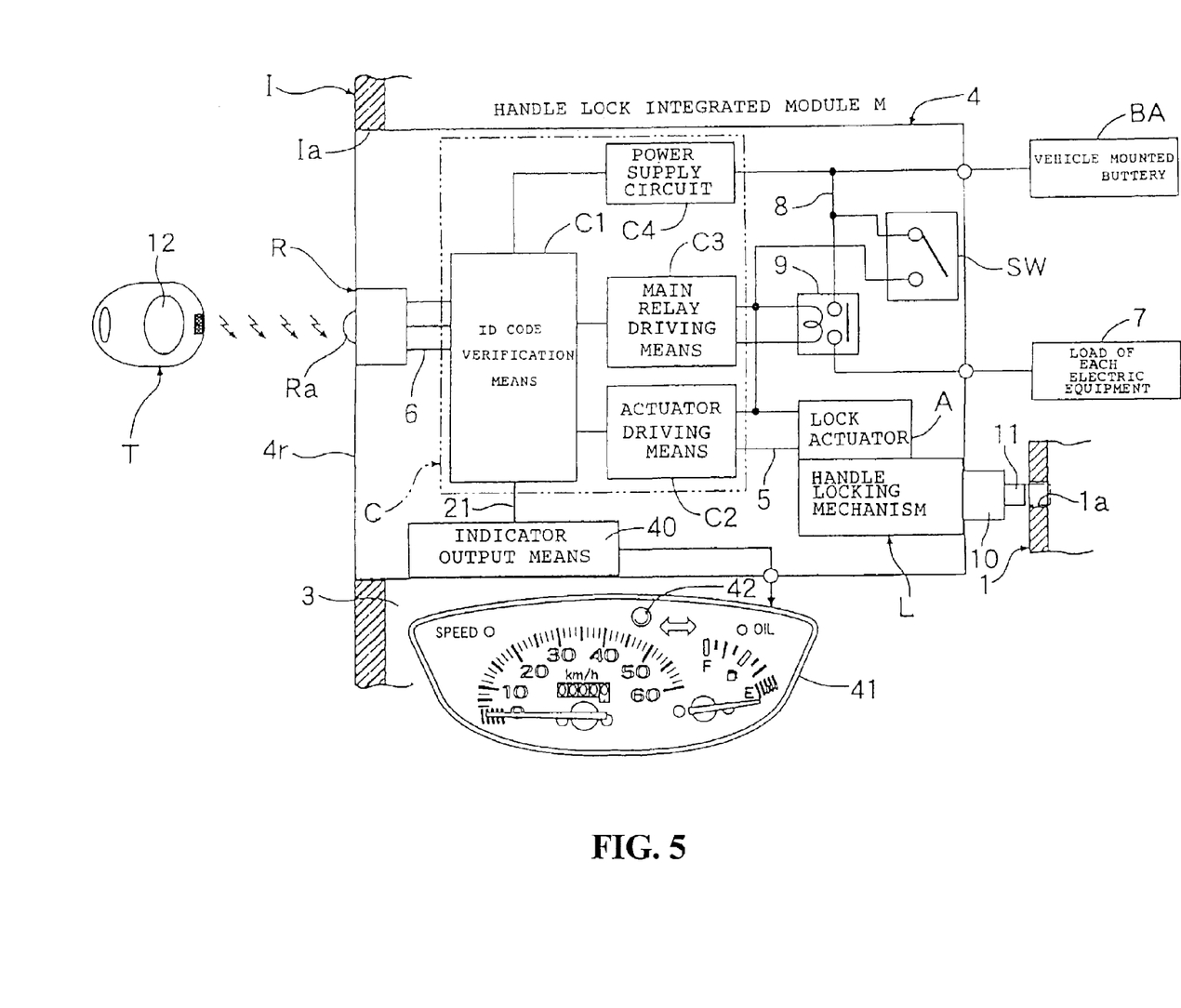
FIG. 5 is a schematic drawing showing a forth embodiment of the integrated handle lock module.

FIG. 5 shows a fourth embodiment of the integrated handle lock module M. Indicator output means 40 is provided in the module housing 4. The indicator output means 40, being controlled by the control unit C based on the signal received by the infrared receiver R, supplies a light emitting signal to the indicator 42 including a LED or a electric bulb of the vehicle instrument panel 41.

Figure 6:
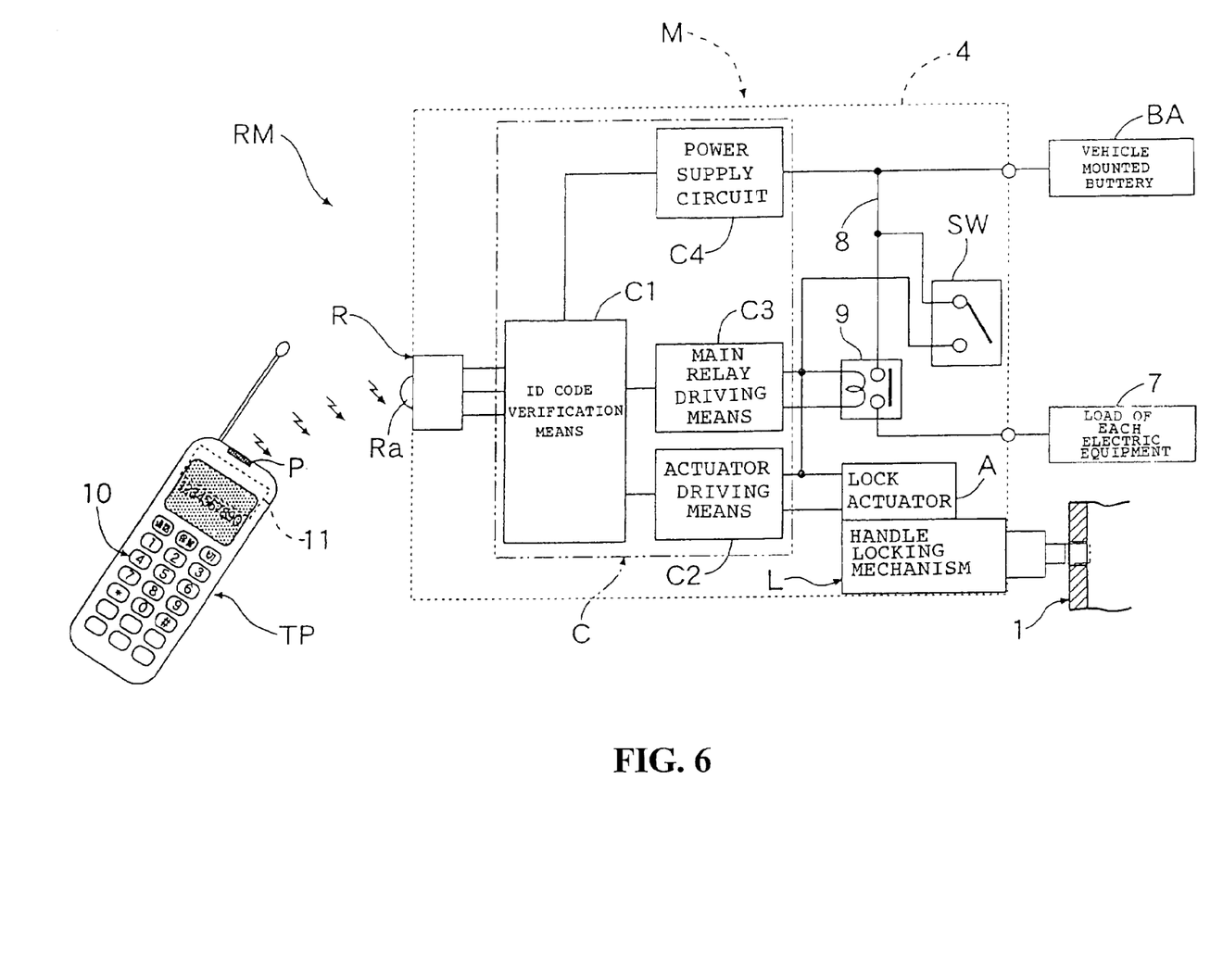
FIG. 6 shows a mobile phone as an emergency communication means for operating the lock actuator.

FIG. 6, shows the use of a mobile phone TP as an emergency communication means for operating the lock actuator, when the hand-held remote transmitter is not available. The mobile phone TP has the conventional function of a normal mobile phone. It includes an infrared transceiver port P capable of sending and receiving the infrared signal, and a transmission control means 11 for allowing the infrared signal corresponding to the ID code by the input operation on the operating panel 10 to be transmitted from the infrared transceiver port P.

The ID code as the specific identification data and the transmitting program for allowing the infrared signal corresponding to the ID code to be transmitted from the infrared transceiver_port P by the input operation on the operating panel 10 are entered in advance into the storage section of the transmission control means 11.

The ID code as the specific identification data and the transmitting program for allowing the infrared signal corresponding to the ID code to be transmitted from the infrared transceiverport P by the input operation on the operating panel 10 are entered in advance into the storage section of the transmission control means 11.

Therefore, in the case where the remote control transmitter T is lost or not in the user's hands due to some other reason, the specific input operation is made on the operating panel 10 of the mobile phone TP with the infrared transceiver port P of the mobile phone TP faced toward the infrared receiving portion Ra of the remote control receiver R. The transmission control means 11 allows the infrared signal corresponding to the ID code to be transmitted from the infrared transceiver port P in response to the input operation. When the infrared signal is received by the infrared receiving portion Ra of the remote control receiver R, the control unit C of the remote control lock operation device RM operates and controls the lock actuator A and unlocks the same as in the case of the aforementioned normal remote control operation upon receipt of the infrared signal.

Therefore, even when the remote control transmitter T has been lost or is not in the user's hands due some other reason, the lock actuator A can easily be operated and controlled by means of the mobile phone TP having the infrared transceiver port P without using the key.

Figure 7:
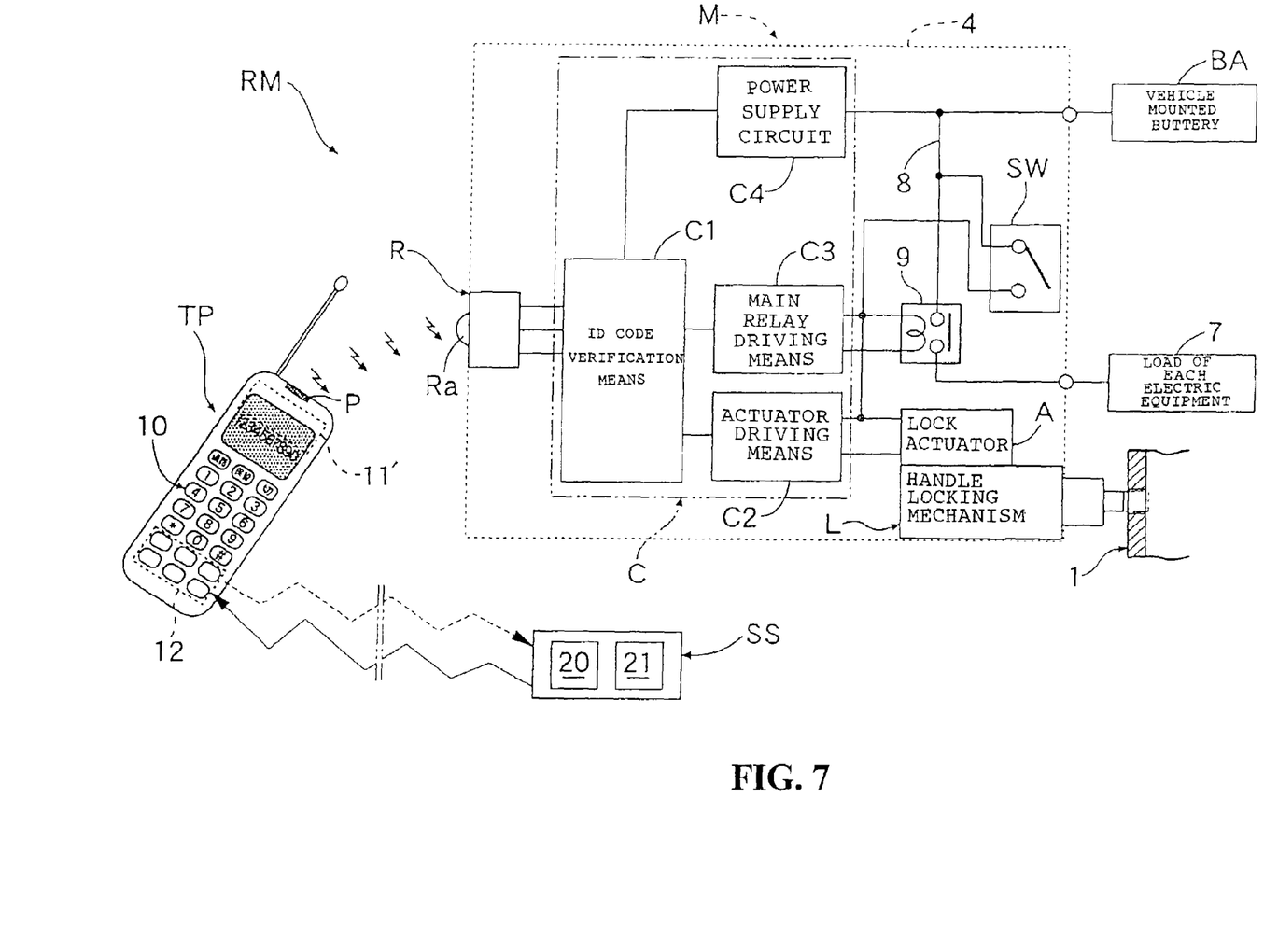
FIG. 7 shows a mobile phone as an emergency communication means for operating the lock actuator, and a service center capable of transmitting a command signal to the phone.

FIG. 7 shows a second means of providing an emergency communication means for operating the lock actuator. Included are the mobile phone TP, and a service center SS capable of transmitting a command signal to the mobile phone.

The mobile phone TP serves as a mobile communication terminal having the infrared transceiver port P capable of sending and receiving the infrared signal. The service center SS is capable of transmitting the command signal to the mobile phone TP as needed.

The mobile phone TP has a function as a conventional normal mobile phone and includes a receiving means 12 capable of receiving command electric wave as a command signal transmitted from the service center SS, and a transmission control means 11' for allowing the infrared signal corresponding to the ID code to be transmitted from the infrared transceiver port P upon receipt of the command electric wave.

The ID code as the specific identification data and the transmission program for transmitting the infrared signal corresponding to the ID code from the infrared transceiver port P upon receipt of the command electric wave are entered in the storage section of the transmission control means 11' in advance.

The service center SS includes a communication means 20 such as phone for receiving notification from the user, and an information storing means 21 such as a personal computer in which personal information for identifying the user upon receipt of the notification (for example, the ID code, the vehicle body frame number, the license number, and so on of the user) are registered and stored in advance. In the service center SS, support personnel may be available 24 hours/day for receiving the notification from users and responding thereto.

As is described thus far, in the case where the remote control transmitter T has been lost or is not in the user's hands due to some other reason, the user notifies the service center SS by means of the mobile phone TP, or other means. In the service center SS, identification of the user is made based on information stored in the information storing means 21 upon receipt of notification from the user. After identification is made, the command electric wave is transmitted to the mobile phone TP of the user in question.

When the mobile phone TP of the user received the command electric wave from the service center SS, the transmission control means 11' of the phone TP transmits the infrared signal corresponding to the specific ID code from the infrared transceiver port P upon receipt of the command electric wave. In this case, the infrared signal transmitted from the infrared transceiver port P is received by the infrared receiving portion Ra of the remote control receiver R by keeping the infrared transceiver_port P faced toward the infrared receiving portion Ra of the remote control receiver R. Upon receipt of the infrared signal, the control unit C of the remote control lock operation device RM operates and controls the lock actuator A and unlocks the same as in the case of the aforementioned normal remote control operation.

Therefore, even when the remote control transmitter T has been lost or is not in the user's hands due to some other reason, the lock actuator A can be operated and controlled by means of the mobile phone TP with the infrared transceiver port P easily without using the key. In addition, the terminal must receive the command electric wave transmitted after identification of the user by the service center SS before operating and controlling the lock actuator using the mobile communication terminal. Thus, it provides an effective means for preventing unauthorized operation and theft.

Figure 8:
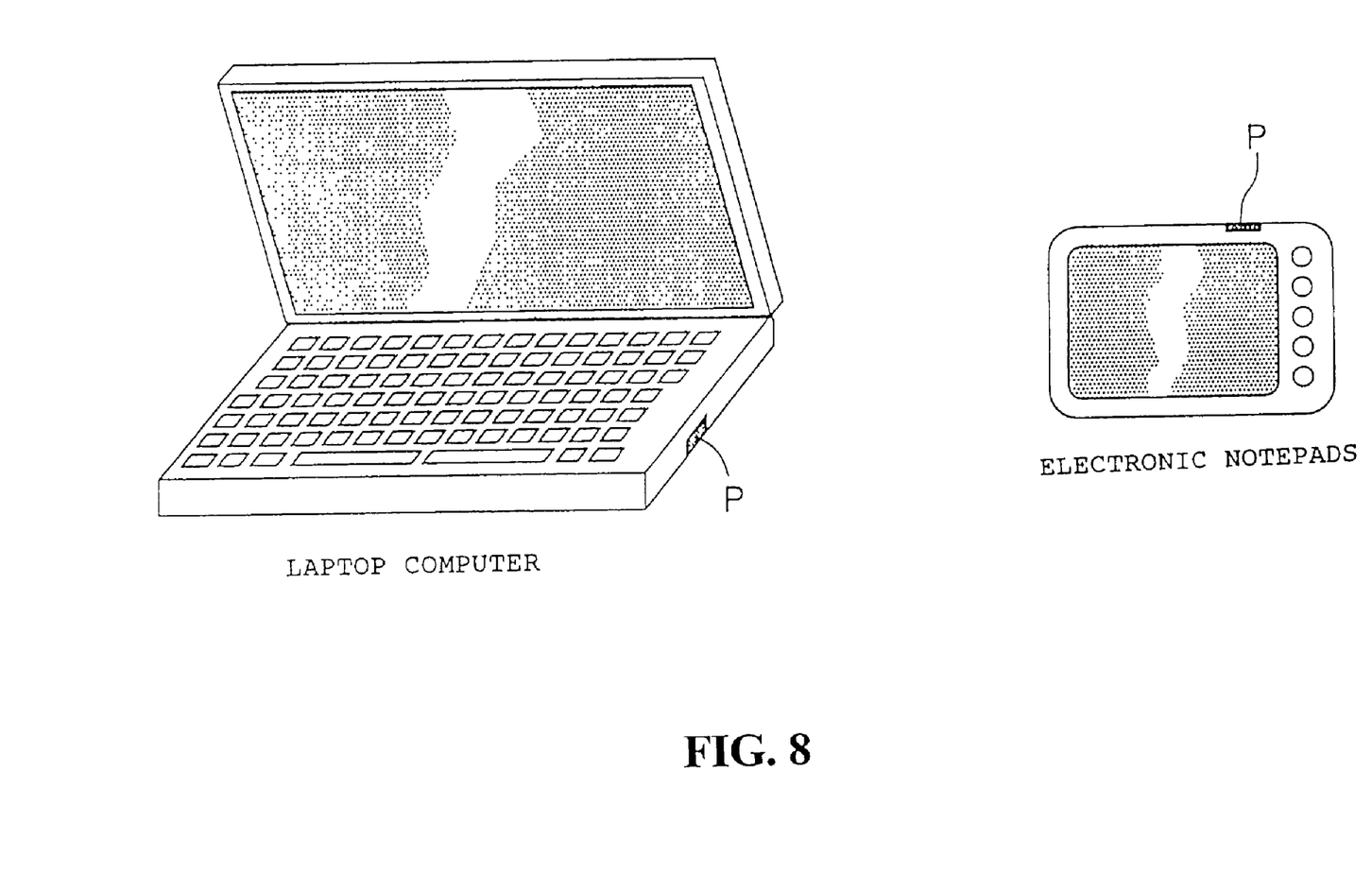
FIG. 8 shows a laptop computer and an electronic notepad, which can act as emergency communication means for operating the lock actuator.

FIG. 8 shows a laptop computer and an electronic notepad. Each of these may also serve as means for emergency communication for operating the lock actuator. Various other third party equipment, such as a mobile game machine, a wristwatch, or a pocket bell may also be used, so long as they are equipped with an infrared transmitter.

The embodiments of the present invention have been described thus far, the present invention is not limited thereto, and various minor design modifications are possible.

For example, a scooter is exemplified as a vehicle. However, the term "vehicle" in the present invention may be two-wheeled vehicle other than the scooter, or may be any of three-wheeled vehicles or four-wheeled vehicles, and whether or not the vehicle is motorized.

In addition, even though the main switch SW is adapted to be opened and closed by the operation of the ignition key in the aforementioned embodiments, the main switch may be a manual switch or a remote control switch independent of the operation of the ignition key in the present invention.

Furthermore, even though the main switch SW and the main relay 9 is mounted in the module housing 4, the main switch or the main relay may be mounted outside of the module housing 4.

Still further, the key cylinder of the ignition key is disposed in the module housing 4 so that the required cooperative relations are established with respect to the main switch SW or the handle locking mechanism L in the aforementioned embodiments. However, the key cylinder may be disposed outside the module housing 4 in the vicinity of the main switch SW or the handle locking mechanism L, so that the required cooperative relations may be established with respect to the main switch SW or the handle locking mechanism L.

Still further, even though the locking mechanism L is locked by manual operation (that is, in conjunction with pulling out of the ignition key from the key cylinder) in the aforementioned embodiments, it is also possible to construct the locking mechanism L in such a manner that not only unlocking operation but also locking operation thereof are performed by the signal transmitted from the transmitters T, T'.

Furthermore, in the description above, both of the user-specific identification data (ID code) and the transmitting program for allowing the terminal TP to transmit the infrared signal corresponding to the specific identification data (ID code) from the infrared transmitting port P in response to the command signal transmitted from the service center SS are entered in the mobile communication terminal TP in advance. However, the system may be constructed in such a manner that the user-specific identification data (ID code) is only registered to the service center SS without being entered into the mobile communication terminal TP. In this case, when the service center SS transmits the command signal to the mobile communication terminal TP based on the identification of the user, it transmits the specific identification data (ID code) through the command signal, so that the terminal TP transmits the infrared signal corresponding to the specific identification data (ID code) from the infrared transmitting port P according to the present invention.

The invention thus described affords numerous benefits. These are highlighted below:

Since the mechanical locking mechanism, the receiver, and the lock actuator and the control unit thereof that are the main components of the remote control lock operation system, and the wiring section for connecting the lock actuator or the like to the control unit are unitized in the common module housing, and thus they can be mounted on the vehicle body via the housing at a time, the total number of the components is small, and thus it is easy to handle and to install on the vehicle body. Therefore, the size, weight, and cost of the system are reduced. In addition, modification of the portion on the vehicle body on which the system is to be mounted may be minimized. Furthermore, since the wiring section leading to the lock actuator can be hidden and protected in the module housing so as not to be exposed to the outside, dishonest unlocking, and thus theft of the vehicle by connecting the wiring section directly to the battery power source or changing connection thereof may be effectively prevented.

2.) In the unlikely event that the main power source is turned on by an unauthorized user, starting of engine and the operation cannot be enabled unless the drive enable signal generating means generates a drive enable signal based on the regular signal received by the receiver. This provides an effective means for preventing theft of the vehicle.

3.) The main switch and the main relay are also integrated in the module housing. Thus the system can be consolidated, thereby further contributing to cost reduction.

4.) The remote control lock operation system with the unitized handle locking mechanism integrated into a two-wheeled vehicle, and secured toward the rear through the opening on the inner cover. In this position, the signal receiving portion of the receiver is able to receive infrared signals from a wide range of angles.

5.) When the remote control transmitter has been lost or is not in the user's hands due to some other reason, the infrared signal for operating and controlling the lock actuator may be transmitted toward the infrared receiving portion of the remote control receiver by means of the mobile communication terminal having the infrared transmitting port capable of transmitting the infrared signal. Thus, the lock actuator can be operated and controlled easily without using the remote control transmitter thus without using the key.

In addition, the mobile communication terminal serves as an alternative transmitter, and thus it is not necessary to provide a separate remote control transmitter, thereby offering another way to reduce costs.

6.) With the invention mobile communication terminal must receive the command signal transmitted after identification of the user by the service center before operating and controlling the lock actuator using the mobile communication terminal. Thus, it is an effective means for preventing unauthorized operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A remote control lock operation system for vehicles, comprising:
   a hand-held transmitter;
   a receiver capable of receiving the signal transmitted by the transmitter;
   a mechanical locking mechanism for mechanically disabling travel of the vehicle;
   a lock actuator capable of at least unlocking the mechanical locking mechanism;
   a control unit for determining whether or not the signal received by the receiver is acceptable, and operating and controlling the lock actuator based on the received signal when the signal is acceptable; and
   a common module housing mounted below a handlebar on a body of the vehicle, the housing enclosing the receiver, the mechanical locking mechanism, the lock actuator, the control unit, and wiring sections connecting the lock actuator and the receiver to the control unit,
   the common module housing being disposed in a space between a front body cover and an inner cover of the vehicle, wherein a signal receiving portion of the receiver is directed rearwardly from a central portion of the inner cover, the inner cover extending upwardly and rearwardly over the common module housing so that the signal receiving portion of the receiver is not exposed from above.

2. The remote control lock operation system for vehicles according to claim 1, further comprising drive enable signal generating means controlled by the control unit based on the signal received by the receiver and capable of generating a drive enable signal for enabling actuation or operation of the engine and being mounted in the common module housing together with the wiring section for connecting the means to the control unit.

3. The remote control lock operation system for vehicles according to claim 1, wherein a part of power distribution circuit for distributing a power from a battery to the respective vehicle mounted electric equipment, a main relay for opening and closing the part of the power distribution circuit, and a main switch for turning the main relay on and off are mounted in the common module housing.

4. The remote control lock operation system for vehicles according to claim 1, wherein the vehicle is a two-wheeled vehicle comprising a front fork for rotatably supporting the front wheel, a steering shaft rotatably supported on a front portion of the vehicle body for linking a front fork and a steering handle to steer and operate the front wheel, a front body cover for covering a front side of the steering shaft, and an inner cover connected to the front body cover for covering a rear side of the steering shaft, in that the common module housing is disposed in a vehicle body space formed between the front body cover and the inner cover, and provided with a signal receiving portion of the receiver on a rear surface thereof so as to be exposed toward the rear through an opening of the inner cover, and in that the mechanical locking mechanism is a handle locking mechanism capable of locking the rotation of the steering shaft.

5. The remote control lock operation system for vehicles according to claim 1, wherein the portable transmitter is a mobile communication terminal and further comprises:
  an infrared transmitting port capable of transmitting an infrared signal,
  input operation means for commanding transmission of the infrared signal from the infrared transmitting port arbitrarily, and
  transmission control means for allowing the infrared signal corresponding to prescribed identification data to be transmitted from the infrared transmitting port in response to an input operation on the input operation means.

6. An emergency operating system for operating and controlling a lock actuator of an infrared remote control lock operation device, comprising:
  a remote control transmitter capable of transmitting an infrared signal corresponding to prescribed identification data;
  a remote control receiver capable of receiving the infrared signal transmitted from the remote control transmitter;
  a lock actuator coupled to the locking mechanism;
  a control unit for controlling the operation of the lock actuator according to the received signal when the signal received by the remote control receiver corresponds to the prescribed identification data without using the remote control transmitter;
  a service center capable of transmitting a command signal as needed to the mobile communication terminal;
  a mobile communication terminal having an infrared transmitting port that is capable of transmitting an infrared signal, the mobile communication terminal including receiving means capable of receiving a command signal transmitted from the service center, and transmission control means for allowing an infrared signal corresponding to the prescribed identification data to be transmitted from the infrared transmitting port upon receipt of the command signal,
  wherein the service center includes communication means for receiving notification from the user, and information storage means in which information for identifying a user upon receipt of notification is stored in advance.

7. The emergency operating system for operating and controlling the lock actuator of the infrared remote control lock operation device according to claim 6,
  further comprising a common module having mounted on a vehicle body for housing the receiver, the mechanical locking mechanism, the lock actuator, the control unit, and wiring sections connecting the lock actuator and the receiver to the control unit.

8. The emergency operating system for operating and controlling the lock actuator of the infrared remote control lock operation device according to claim 6, wherein the mobile communication terminal is a mobile phone.

9. The emergency operating system for operating and controlling the lock actuator of the infrared remote control lock operation device according to claim 6, wherein the mobile communication terminal is a laptop computer, an electronic notebook, a mobile game machine, or a wristwatch.

10. A method of emergency operation for operating and controlling a lock actuator of an infrared remote control lock operation device including a remote control transmitter capable of transmitting an infrared signal corresponding to prescribed identification data, a remote control receiver capable of receiving the infrared signal transmitted from the remote control transmitter, a lock actuator coupled to the locking mechanism, and a control unit for controlling the operation of the lock actuator according to the received signal when the signal received by the remote control receiver corresponds to the prescribed identification data without using the remote control transmitter, the method comprising the steps of:
  entering a transmission program in advance into the mobile communication terminal having an infrared transmitting port capable of transmitting an infrared signal and a capability of receiving a command signal transmitted from a service center so that the terminal transmits an infrared signal corresponding to prescribed identification data from the infrared transmitting port according to the command signal transmitted from the service center;
  identifying a user when the service center has received notification from the user;
  facing the infrared transmitting port on the mobile communication terminal toward an infrared receiving portion on the remote control receiver; and
  transmitting the infrared signal corresponding to the prescribed identification data from the infrared transmitting port of the terminal toward the infrared receiving portion on the remote control receiver by transmitting the command signal from the service center to the mobile communication terminal based on the identification to operate and control the lock actuator.

11. The method of emergency operation for operating and controlling the lock actuator of the infrared remote control lock operation device according to claim 10, wherein the mobile communication terminal is a mobile phone.

12. The method of emergency operation for operating and controlling the lock actuator of the infrared remote control lock operation device according to claim 10, wherein the mobile communication terminal is a laptop computer, an electronic notebook, a mobile game machine, or a wristwatch.

13. The remote control lock operation system according to claim 1, wherein the receiver is disposed on a rear surface of the common module, and the mechanical locking mechanism projects out from an opposite side the common module and engages with a vehicle locking hole.

14. The emergency operating system for operating and controlling the lock actuator of the infrared remote control lock operation device according to claim 6, wherein the receiver is disposed on a rear surface of the common module, and the mechanical locking mechanism projects out from an opposite side the common module and engages with a vehicle locking hole.

15. The remote control lock operation system according to claim 1, wherein the mechanical locking mechanism is secured to the vehicle through an opening of the inner cover.

16. The emergency operating system for operating and controlling the lock actuator of the infrared remote control lock operation device according to claim 6, wherein the mechanical locking mechanism is secured to the vehicle through an opening of the inner cover.

17. The remote control lock operation system according to claim 1, wherein the wiring section is hidden and protected in the common module housing so as not to be exposed to the outside, dishonest unlocking, and thus theft of the vehicle by connecting the wiring section directly to a battery power source or changing connection thereof may be effectively prevented.

* * * * *